US012680610B2

(12) United States Patent
Yang et al.

(10) Patent No.: US 12,680,610 B2
(45) Date of Patent: Jul. 14, 2026

(54) DUAL DRIVE GEAR SHIFT ASSEMBLY FOR VEHICLE GEARBOX

(71) Applicant: BorgWarner Inc., Auburn Hills, MI (US)

(72) Inventors: Bo Yang, Central, SC (US); Chandreshwar Rao, Lake Orion, MI (US); Ashton Anderson, Central, SC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 18/785,034

(22) Filed: Jul. 26, 2024

(65) Prior Publication Data

US 2026/0029052 A1 Jan. 29, 2026

(51) Int. Cl.
*F16H 63/04* (2006.01)
*B60K 17/344* (2006.01)

(52) U.S. Cl.
CPC ........... *F16H 63/04* (2013.01); *B60K 17/344* (2013.01)

(58) Field of Classification Search
CPC ............................. F16H 63/04; B60K 17/344
See application file for complete search history.

(56) References Cited

U.S. PATENT DOCUMENTS

| | | | | |
|---|---|---|---|---|
| 10,988,022 | B2 * | 4/2021 | Pritchard | B60K 23/08 |
| 2006/0132069 | A1 | 6/2006 | Hemphill et al. | |
| 2020/0254872 | A1 * | 8/2020 | Pritchard | B60K 17/35 |
| 2023/0258262 | A1 * | 8/2023 | Hutcheon | F16H 59/42 475/158 |

FOREIGN PATENT DOCUMENTS

| | | |
|---|---|---|
| CN | 108644319 B | 5/2020 |
| JP | 2008074239 A | 4/2008 |
| KR | 1020170051729 A | 5/2017 |
| WO | WO2022135101 A1 | 6/2022 |

OTHER PUBLICATIONS

Written Opinion & International Search Report for PCT/US2025/038398 dated Nov. 16, 2025, (9 pages).

* cited by examiner

*Primary Examiner* — Minnah L Seoh
*Assistant Examiner* — Gregory T Prather
(74) *Attorney, Agent, or Firm* — Reising Ethington P.C.

(57) ABSTRACT

A dual drive gear shift assembly for a vehicle gearbox such as an automotive transfer case is depicted and described. Certain features and functions previously carried out by multiple parts in past devices are combined in single components in the dual drive gear shift assembly, furnishing a reduced quantity of overall parts and a reduction in overall weight. The dual drive gear shift assembly, per certain implementations, can include a shift cam housing, a sensor plate, a dual drive gear, and a thrust washer, among other possible components. The sensor plate and dual drive gear can be attached together, and one or more tabs of the thrust washer can be received in one or more complementary slots of the shift cam housing.

18 Claims, 5 Drawing Sheets

12, 14

DUAL DRIVE GEAR SHIFT ASSEMBLY FOR VEHICLE GEARBOX

TECHNICAL FIELD

The present application relates to shifting systems in vehicle gearboxes and, more particularly, to dual drive gear shifters in vehicle gearboxes such as automotive transfer cases.

BACKGROUND

Vehicle gearboxes, such as automotive transfer cases, serve to transfer power from a transmission and to axles that are driven to rotate in four-wheel drive and all-wheel drive vehicles. In the case of transfer cases in automobiles, in general, the transfer cases are employed to shift automobiles from two-wheel drive mode to four-wheel or all-wheel drive mode, and in certain types can shift between more than one gear setting like a low gear setting and a high gear setting, for instance. Dual drive gear shifters may be equipped within the vehicle gearboxes and within the transfer cases for such purposes. U.S. Pat. No. 10,988,022 discloses a dual drive gear of an actuation assembly for a transfer case.

SUMMARY

In an implementation, a dual drive gear shift assembly for a vehicle gearbox is provided. The vehicle gearbox can be an automotive transfer case, as an example. The dual drive gear shift assembly may include a shift cam housing, a sensor plate, and a dual drive gear. The sensor plate is situated at or near a periphery of the shift cam housing. The dual drive gear is likewise situated at or near the periphery of the shift cam housing. The dual drive gear is constrained to the sensor plate by way of attachment. Furthermore, the dual drive gear has a gear main body and one or more projections. The projection(s) extends in an axial direction from the gear main body. The projection(s) can engage an apply cam of the dual drive gear shift assembly amid use the dual drive gear shift assembly.

In another implementation, a dual drive gear shift assembly for a vehicle gearbox is provided. The vehicle gearbox can be an automotive transfer case, as an example. The dual drive gear shift assembly may include a shift cam housing, a sensor plate, a dual drive gear, and a thrust washer. The shift cam housing has one or more slots that reside therein. The sensor plate is situated at or near a periphery of the shift cam housing. The dual drive gear is likewise situated at or near the periphery of the shift cam housing and is situated at or near the sensor plate. The thrust washer has a washer main body and one or more tabs. The tab(s) extends radially inboard from the washer main body. The thrust washer is situated at or near the periphery of the shift cam housing and is situated at or near the dual drive gear. The tab(s) is received in the slot(s) of the shift cam housing. Axial movement of the thrust washer with respect to the shift cam housing is constrained via the tab(s) being received in the slot(s).

In yet another implementation, a dual drive gear shift assembly for a vehicle gearbox is provided. The vehicle gearbox can be an automotive transfer case, as an example. The dual drive gear shift assembly may include a shift cam housing, a sensor plate, a dual drive gear, a thrust washer, and a base cam. One or more slots reside in the shift cam housing, and one or more cutouts reside in the shift cam housing. The sensor plate is situated at or near a periphery of the shift cam housing. The dual drive gear is likewise situated at or near the periphery of the shift cam housing. The dual drive gear and sensor plate are attached to each other. The dual drive gear has one or more axially extending projections. The thrust washer is situated at or near the periphery of the shift cam housing. Further, the thrust washer has one or more radially-extending tabs. The base cam has one or more radially-extending bosses. In assembly of the dual drive gear shift assembly, the radially-extending tab(s) of the thrust washer is received in the slot(s) of the shift cam housing, and the radially-extending boss(es) of the base cam is received in the cutout(s) of the shift cam housing.

DETAILED DESCRIPTION

Embodiments of a dual drive gear shift assembly 10 are presented in the figures and detailed in this description. The dual drive gear shift assembly 10 can be equipped within a vehicle gearbox 12 such as an automotive transfer case 14, per an example implementation. Compared to past devices, the dual drive gear shift assembly 10 has fewer parts and much less weight. Certain features and functions previously carried out by multiple parts in past devices are combined in single components in the dual drive gear shift assembly 10. A reduced quantity of overall parts and a reduction in overall weight results. Potential axial lash—observed in past devices—is minimized or altogether eliminated by these combined components and reductions. Further, assembly and installation of the dual drive gear shift assembly 10 is eased due to the removal of certain parts that had challenging alignment procedures for installation. In automotive applications, such advancements are increasingly sought and often demanded of automotive companies. A more effective and more efficient dual drive gear shift assembly 10 is hence furnished. Still, a particular embodiment of the dual drive gear shift assembly 10 may exhibit only one or a combination of the advancements set forth herein, none of the advancements, or yet other advancements unmentioned. Furthermore, as used herein and unless otherwise specified, the terms radially, axially, and circumferentially, and their grammatical variations refer to directions with respect to the generally circular and cylindrical shape of the dual drive gear shift assembly 10 and its components, as illustrated in the figures.

Figure 1:
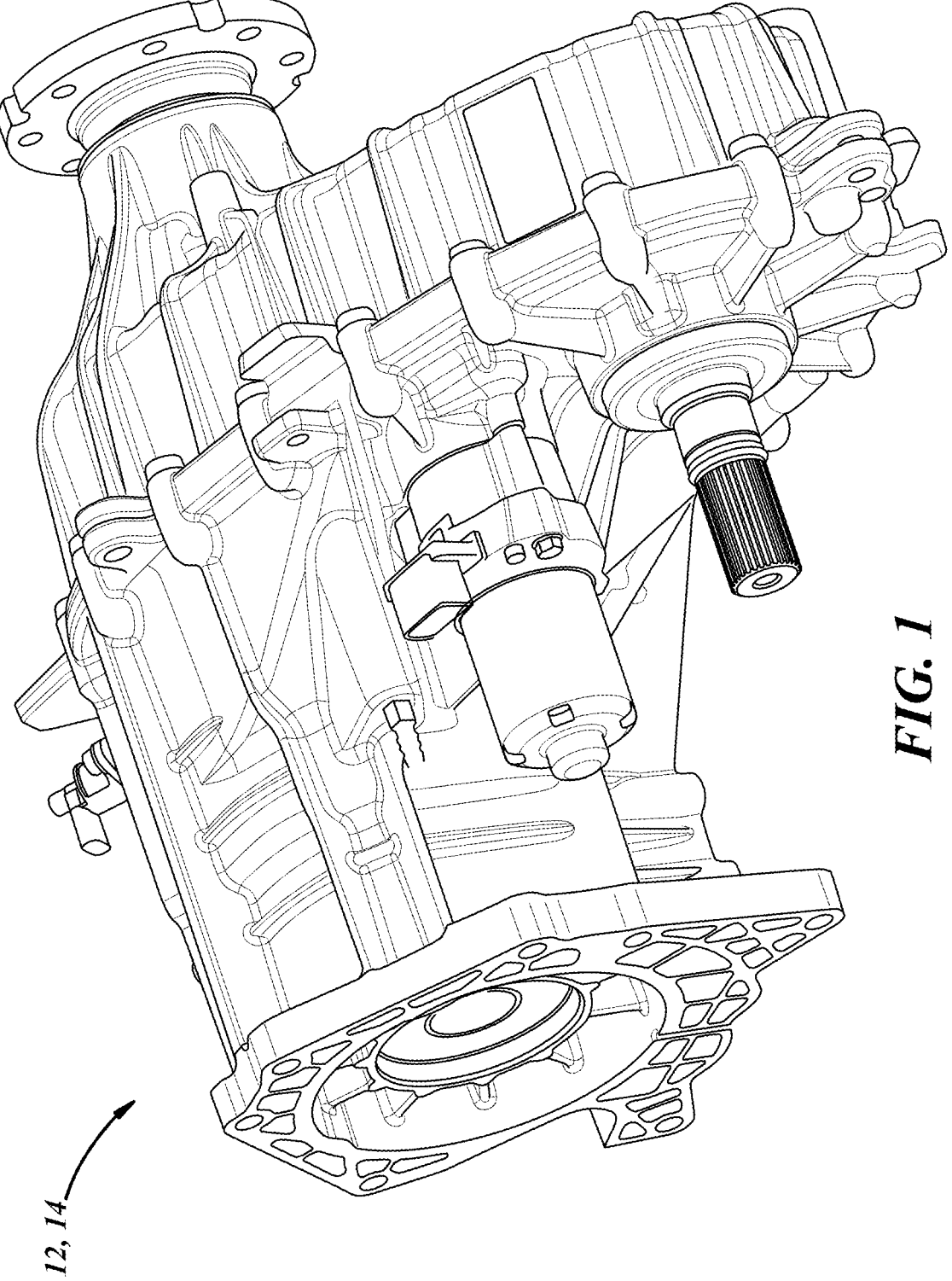
FIG. 1 is a perspective view of an embodiment of a vehicle gearbox.
Figure 2:
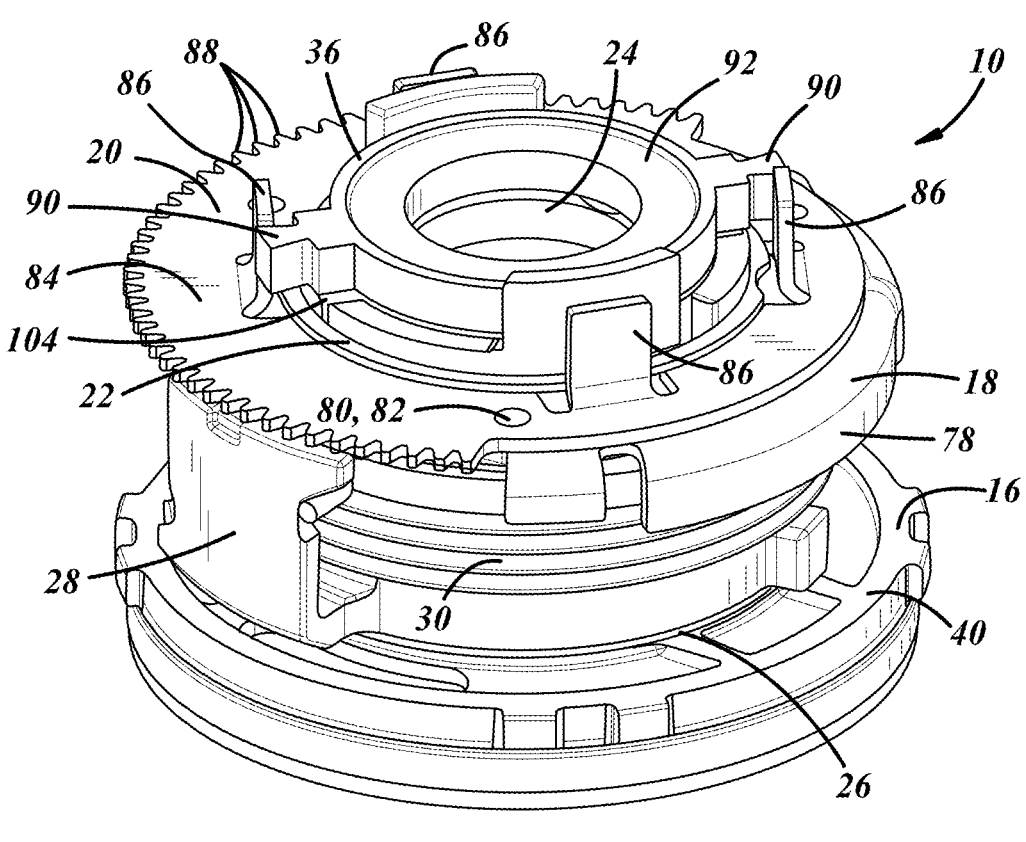
FIG. 2 is a perspective view of an embodiment of a dual drive gear shift assembly.

With reference to FIG. 1, the dual drive gear shift assembly 10 is installed within an interior of the automotive transfer case 14 as one of many assemblies equipped and functioning therein. The dual drive gear shift assembly 10 serves to assist shifting automobiles from two-wheel drive mode to four-wheel or all-wheel drive mode, and in certain types can assist shifting between more than one gear setting like a low gear setting and a high gear setting. The dual drive gear shift assembly 10 of FIG. 2 is designed and constructed to effect two-speed shifting in the automotive transfer case 14, while the dual drive gear shift assembly of FIG. 8, on the other hand, is designed and constructed to effect one-speed shifting in the automotive transfer case 14. The dual drive gear shift assembly 10 can have various designs, constructions, and components in various embodiments depending upon—among other potential factors—the vehicle gearbox in which the dual drive gear shift assembly 10 is installed and the intended parameters of its shifting capabilities. In a first embodiment of FIGS. 2-7, the dual drive gear shift assembly 10 includes a shift cam housing 16, a sensor plate 18, a dual drive gear 20, a thrust washer 22 (or a self-lock thrust washer), and a base cam 24; still, more, less, and/or different components are possible in other embodiments. Furthermore, skilled artisans may appreciate that the dual drive gear shift assembly 10 can also include a plastic washer 26, a range cam 28, a spring 30, a cam ball cage 32 and cam balls 34, and an apply cam 36.

The shift cam housing 16 serves to support components of the dual drive gear shift assembly 10. It can have varying designs and constructions in varying embodiments. In this embodiment, and with reference to FIGS. 3 and 6, the shift cam housing 16 has a main body portion 38 and an expanded-diameter portion 40. The main body portion 38 extends axially from the expanded-diameter portion 40. For accepting circumferentially-directed insertion of a multitude of tabs (introduced below) of the thrush washer 22, a multitude of slots 42 are defined in and reside in the main body portion 38 of the shift cam housing 16. Once inserted, the thrust washer 22 is physically constrained with respect to the shift cam housing 16 in the axial and radial directions and—due to interactions with the base cam 24 (described below)—is constrained partly or more in the circumferential direction.

The slots 42 are shaped and sized to receive the tabs and are located at an axial upper region of the shift cam housing 16 (the term upper is used here with reference to the orientation of the shift cam housing in the figures). The slots 42 are accessible for reception of the tabs at an outer surface 44 of the main body portion 38. The slots 42 in this embodiment do not span wholly radially through the main body portion 38; still, in other embodiments the slots could span wholly through the shift cam housing and/or could be grooves or other voids residing therein that receive the thrust washer's tabs (the term slots is intended to encompass all of these possibilities). Longitudinal extents of the slots 42 are arranged in the circumferential direction relative to the shift cam housing 16 in order to receive circumferential insertion movement of the tabs. Each slot 42 has a circumferential open end 46 and a circumferential closed end 48. In this embodiment, there are a total of four slots 42 to match the number of corresponding tabs: a first slot 50, a second slot 52, a third slot 54, and a fourth slot 56; still, in other embodiments other quantities are possible including a single slot. The first, second, third, and fourth slots 50, 52, 54, 56 are spaced about the shift cam housing 16 circumferentially therearound and apart from one another.

Furthermore, for accepting axially-directed insertion of the tabs of the thrust washer 22, a multitude of cutouts 58 are defined in and reside in the main body portion 38 of the shift cam housing 16. The cutouts 58 also accept axially-directed insertion and reception of bosses (introduced below) of the base cam 24. The cutouts 58 are located adjacent the slots 42, and indeed the cutouts 58 and slots 42 intersect with each other and communicate with each other. The cutouts 58 are shaped and sized to receive the tabs and to receive the bosses, and are located at the axial upper region of the shift cam housing 16. The cutouts 58 are accessible for reception of the tabs and bosses at an upper surface 60 of the main body portion 38. The cutouts 58 in this embodiment span wholly radially through the main body portion 38; still, in other embodiments the cutouts could be other voids residing in the shift cam housing that receive the tabs and bosses (the term cutouts is intended to encompass all of these possibilities).

Figure 6:
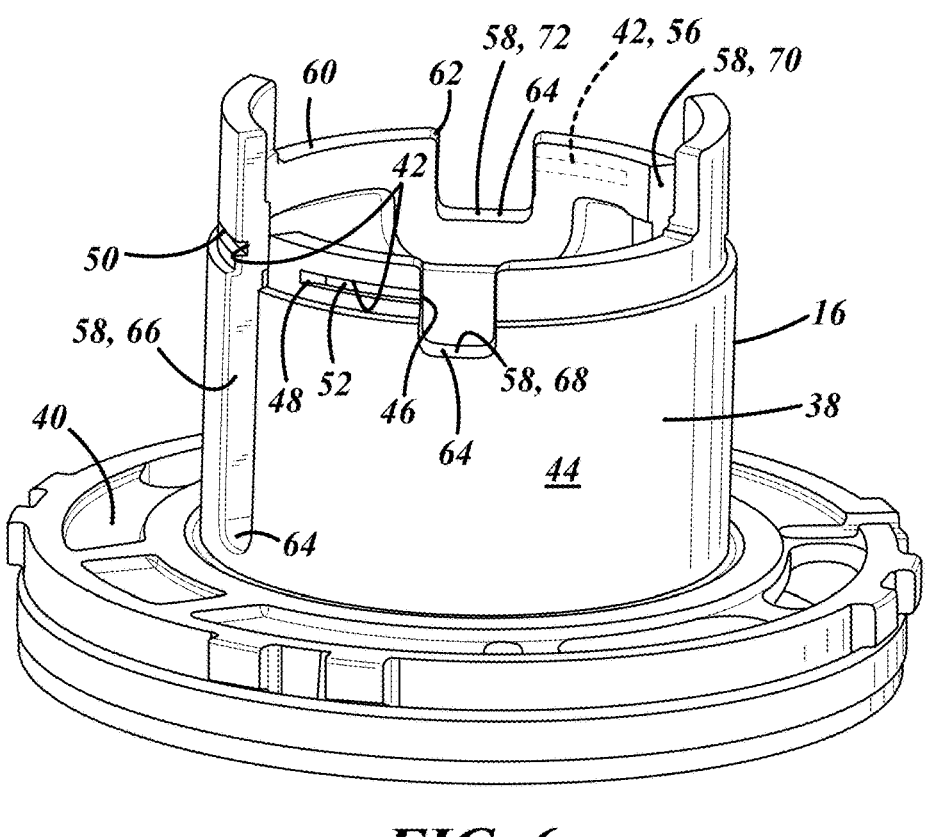
FIG. 6 is a perspective view of an embodiment of a shift cam housing that can be equipped in the dual drive gear shift assembly.
Figure 7:
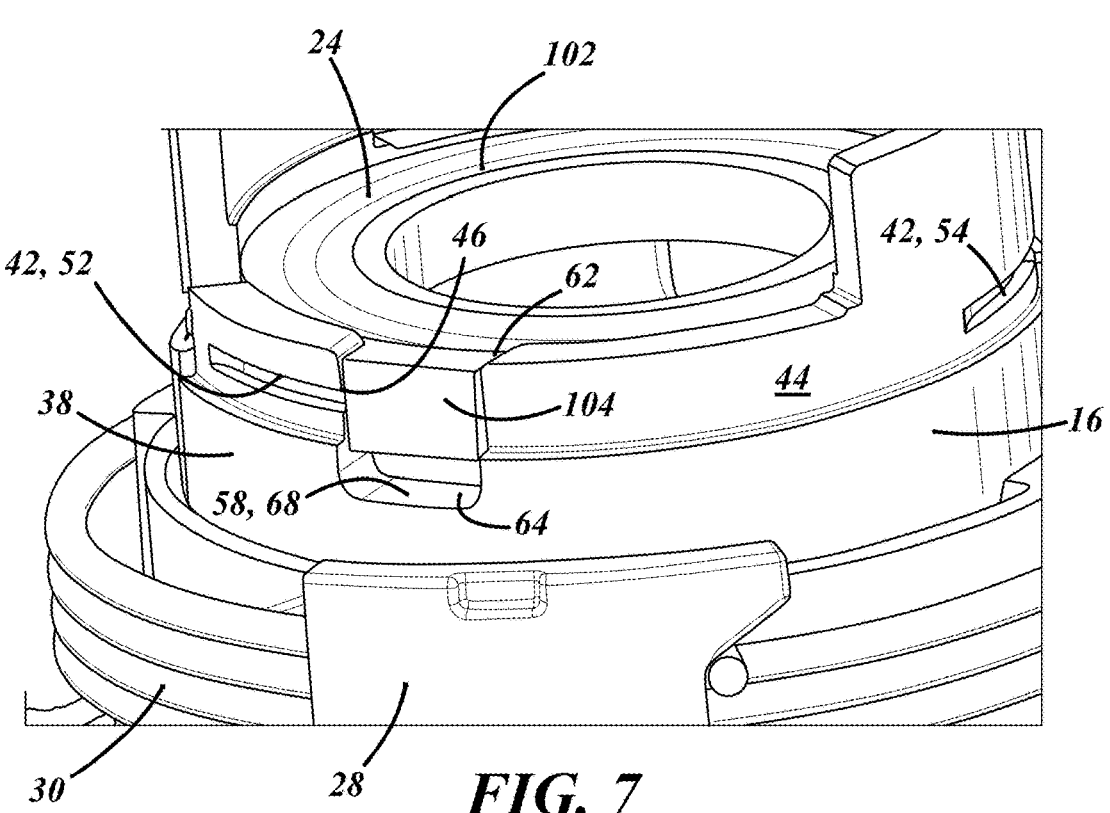
FIG. 7 is an enlarged and segmented view of the shift cam housing and of an embodiment of a base cam that can be equipped in the dual drive gear shift assembly.

Longitudinal extents of the cutouts 58 are arranged in the axial direction relative to the shift cam housing 16 in order to receive axial insertion movement of the tabs and of the bosses. Each cutout 58 has an axial open end 62 and an axial closed end 64, and has circumferential open faces. The circumferential open ends 46 of the slots 42 are open to the cutouts 58, as shown in FIGS. 6 and 7, so that the tabs can initially be axially moved through the cutouts 58 and can subsequently be circumferentially moved through the slots 42. In this embodiment, there are a total of four cutouts 58 that match the number of corresponding tabs: a first cutout 66, a second cutout 68, a third cutout 70, and a fourth cutout 72; still, in other embodiments other quantities are possible including a single cutout. The first, second, third, and fourth cutouts 66, 68, 70, 72 are spaced about the shift cam housing 16 circumferentially therearound and apart from one another. Relative to one another, the cutouts 66, 68, 70, 72 need not possess the same longitudinal and axial depths. In the embodiment here, the first and third cutouts 66, 70 have the same longitudinal and axial depths relative to each other, and the second and fourth cutouts 68, 72 have the same longitudinal and axial depths relative to each other. As illustrated in FIG. 6, the longitudinal and axial depths of the second and fourth cutouts 68, 72 is less than that of the first and third cutouts 66, 70.

Figure 3:
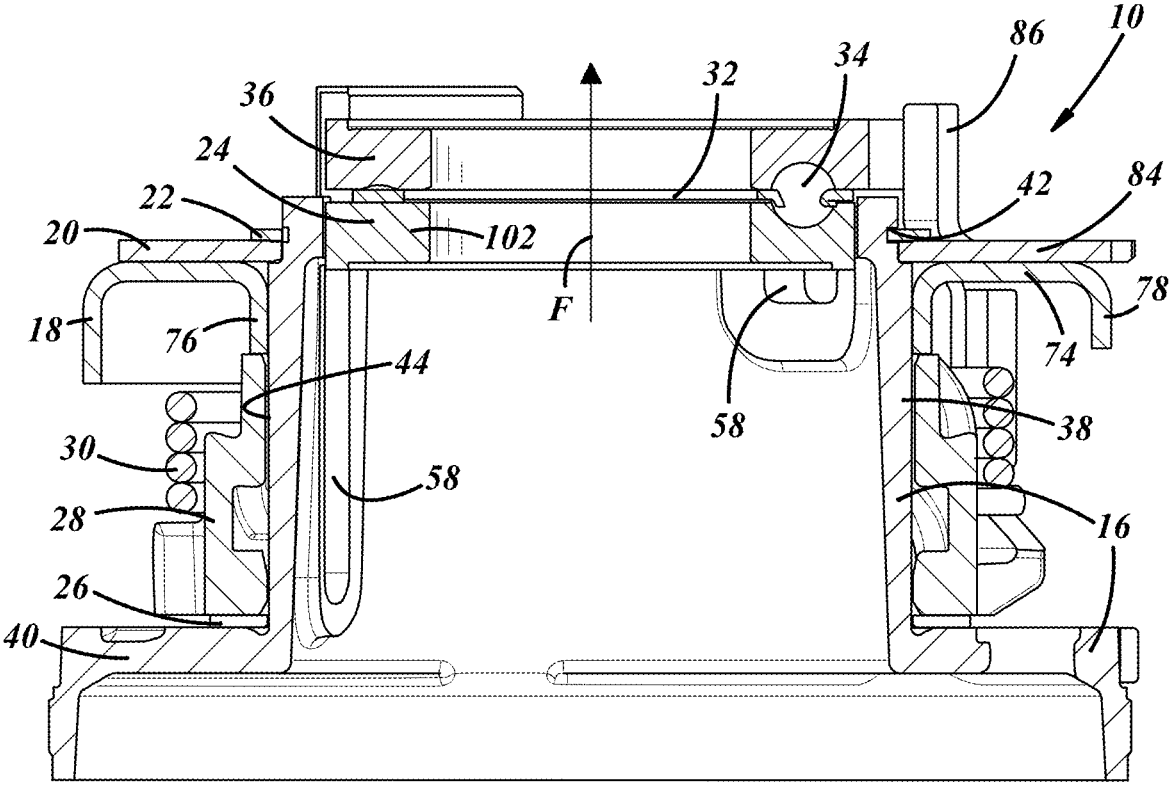
FIG. 3 is a sectional view of the dual drive gear shift assembly.
Figure 4:
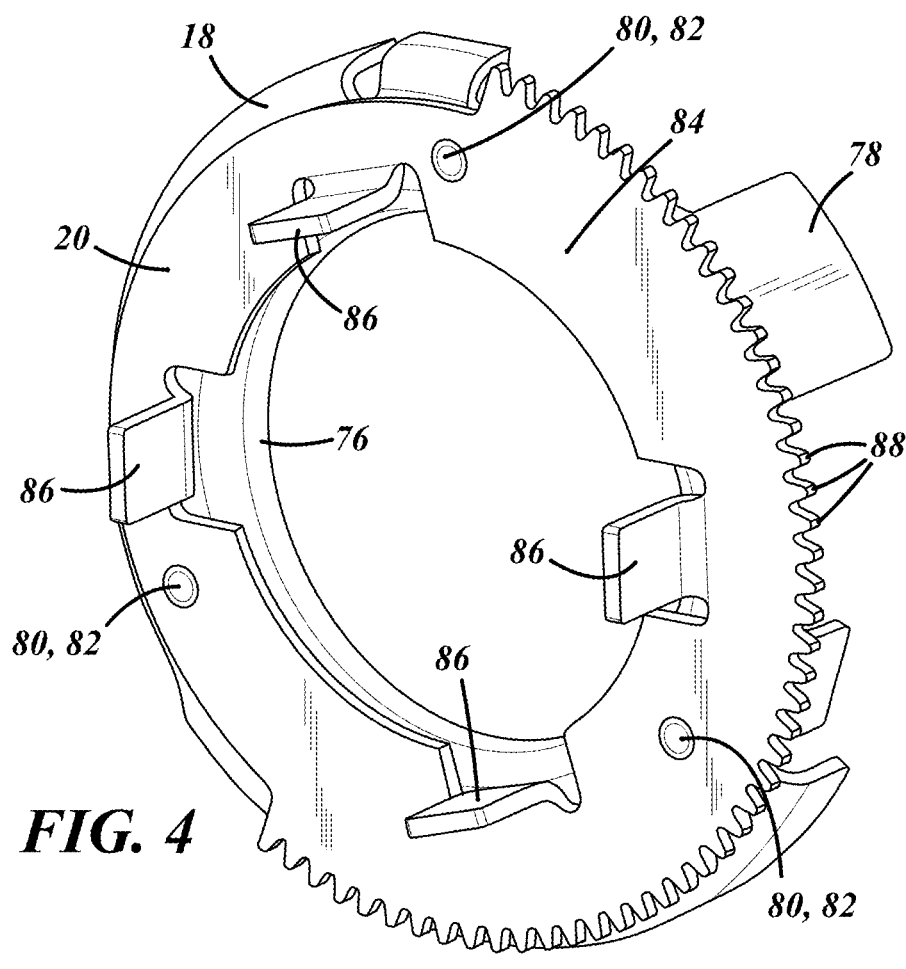
FIG. 4 is a perspective view of an embodiment of a dual drive gear and an embodiment of a sensor plate, both of which can be equipped in the dual drive gear shift assembly.

The sensor plate 18 serves to interact with a sensor of the vehicle gearbox 12—in this example, the automotive transfer case 14—and to provide an indication of which mode and setting is effected in the automotive transfer case 14 (e.g., high speed two-wheel drive mode, low speed four-wheel drive mode, etc.). It can have varying designs and constructions in varying embodiments. In this embodiment, and with reference to FIGS. 2-4, the sensor plate 18 is situated near or at a periphery of the shift cam housing 16 in assembly and installation of the dual drive gear shift assembly 10, and is positioned and located at the main body portion 38 and at the axial upper region of the shift cam housing 16. The sensor plate 18 is located exteriorly of the outer surface 44 of the main body portion 38. Relative to the dual drive gear 20, the sensor plate 18 is positioned axially underneath it and can exhibit surface-to-surface abutment therewith. The sensor plate 18 has a main body portion 74, a shroud 76, and a multitude of projections 78. The shroud 76 depends from the main body portion 74 and extends axially downward therefrom at a radially-inboard location and boundary thereof (the term downward is used here with reference to the orientation of the components in FIG. 3). Abutment can be made between the confronting surfaces of the shroud 76 and the shift cam housing 16, as illustrated in FIG. 3. In a somewhat similar manner, the projections 78 depend from the main body portion 74 and extend axially downward therefrom but at a radially-outboard location and boundary thereof.

Furthermore, the sensor plate 18 and dual drive gear 20 are fully constrained to each other via an attachment 80 therebetween. The attachment 80 can take varying forms in varying embodiments. In this embodiment, and with specific reference to FIGS. 2 and 4, the attachment 80 is carried out via a riveting process and procedure that establishes a mechanical joint and fastening between the sensor plate 18 and dual drive gear 20. Here, a multitude of rivet pins 82—in this example, three in total—are pressed into an equal number of holes formed in the main bodies of the sensor plate 18 and dual drive gear 20. Relative movement between the two components is thereby precluded. The attachment 80 eliminates axial lash between these components that has been observed in past devices due to axial stack-up of parts in the past devices. Once attached, the sensor plate 18 and dual drive gear 20 make face-to-face abutment at their confronting surfaces and remain that way in assembly and installation of the dual drive gear shift assembly 10.

The dual drive gear 20 is engaged and disengaged by gears of the larger vehicle gearbox 12 or of the automotive transfer case 14, depending on the application, amid use of dual drive gear shift assembly 10. The dual drive gear 20 can have varying designs and constructions in varying embodiments. In this embodiment, and with reference to FIGS. 2-4, the dual drive gear 20 is situated near or at the periphery of the shift cam housing 16 in assembly and installation of the dual drive gear shift assembly 10, and is positioned and located at the main body portion 38 and at the axial upper region of the shift cam housing 16. The dual drive gear 20 is located exteriorly of the outer surface 44 of the main body portion 38. Relative to the sensor plate 18, the dual drive gear 20 is positioned axially above it and can exhibit surface-to-surface abutment therewith. The dual drive gear 20 has a gear main body 84 and a multitude of projections 86. Gear teeth 88 extend radially outboard of the gear main body 84 for engagement and disengagement by gears external of the dual drive gear shift assembly 10. The gear teeth 88 can span partly or more around the circumference of the gear main body 84.

The projections 86 depend from the gear main body 84 and extend axially upward therefrom at a radially-inboard location and boundary thereof (the term upward is used here with reference to the orientation of the components in FIG. 3). Here, there are four projections 86 in total that are spaced circumferentially apart from one another about the radially-inboard boundary; still, other quantities are possible in other embodiments. The circumferential spacing can be approximately ninety degrees (90°) apart. The projections 86 span axially upward above the upper surface 60 of the main body portion 38 of the shift cam housing 16. Upon rotation of the dual drive gear 20, and amid use of the dual drive gear shift assembly 10, the projections 86 come into engagement with protuberances 90 of the apply cam 36. The protuberances 90 extend radially-outboard of a main body 92 of the apply cam 36, as shown best by FIG. 2. Side surfaces of the projections 86 and of the protuberances 90 engage each other. By way of the engagement, the apply cam 36 is moved rotationally—either clockwise or counterclockwise, depending on the direction of exertion from the projections 86—and the apply cam 36 and contiguous components are moved axially upward as the cam balls 34 ride in grooved and curved surfaces of the apply cam 36. This driven rotation of the apply cam 36 was previously carried out via a center hub part in the past devices, permitting whole removal of the center hub part in the dual drive gear shift assembly 10. The projections 86 serve to effectively replace the center hub part of the past devices.

The thrust washer 22 serves to support the axial position of the dual drive gear 20 and sensor plate 18 relative to the shift cam housing 16 and, in this two-speed shifting application, serves to bear and withstand axially-directed forces F (FIG. 3) exerted thereto from the dual drive gear 20 amid shifting functions of the dual drive gear shift assembly 10. The thrust washer 22 can have varying designs and constructions in varying embodiments. In this embodiment, and with reference to FIGS. 3 and 5, the thrust washer 22 is situated near or at the periphery of the shift cam housing 16 in assembly and installation of the dual drive gear shift assembly 10, and is positioned and located at the main body portion 38 and at the axial upper region of the shift cam housing 16. The thrust washer 22 is located exteriorly of the outer surface 44 of the main body portion 38. Relative to the sensor plate 18 and dual drive gear 20, the thrust washer 22 is located adjacent the components and positioned axially above both components. The thrust washer 22 has a washer main body 94 and a multitude of tabs 96. The tabs 96 depend from the washer main body 94 and extend radially inboard therefrom at a radially-inboard location and boundary thereof. Here, there are four tabs 96 in total that are spaced circumferentially apart from one another about the radially-inboard boundary; still, other quantities are possible in other embodiments.

Figure 5:
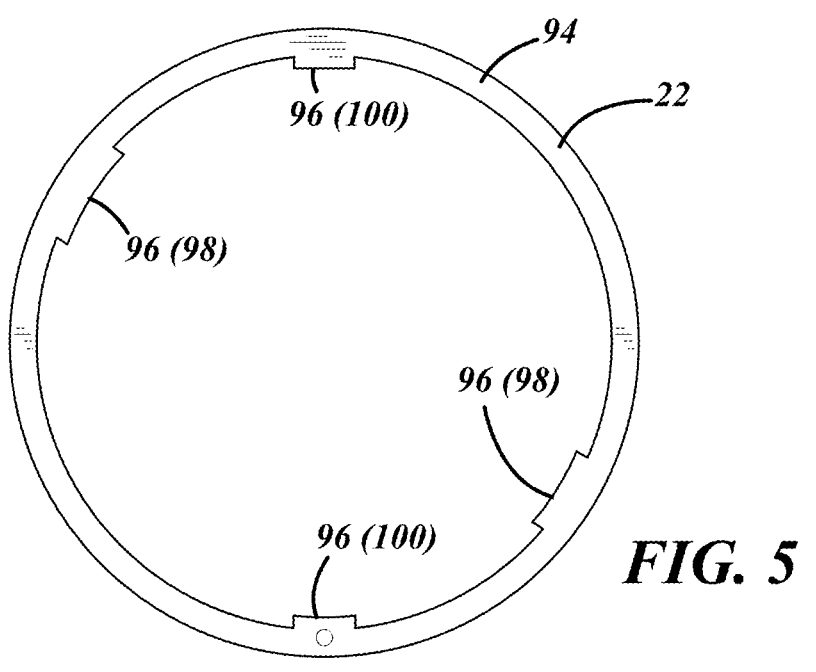
FIG. 5 is a plan view of an embodiment of a thrust washer that can be equipped in the dual drive gear shift assembly.

With reference now to FIG. 5, in order to assist and ensure proper orientation and positioning of the thrust washer 22 with respect to the shift cam housing 16 upon assembly and installation of the thrust washer 22 at the shift cam housing 16, a first pair 98 of the tabs 96 possesses a first circumferential size and extent, while a second pair 100 of the tabs 96 possesses a second circumferential size and extent. The first and second circumferential sizes differ with respect to each other; here, the first circumferential size is greater than the second circumferential size. Similarly, a first pair of the cutouts 58 of the shift cam housing 16 possesses the first circumferential size and extent that corresponds to that of the first pair 98 of the tabs 96, and a second pair of the cutouts 58 possesses the second circumferential size and extent that corresponds to that of the second pair 100 of the tabs 96. In this way, the first pair 98 of the tabs 96 can only be accepted in the first pair of cutouts 58. Intended alignment of the thrust washer 22 with respect to the shift cam housing 16 is thereby enabled. The thrust washer 22 is initially inserted axially downward through the cutouts 58 via their axial open ends 62, and is subsequently inserted circumferentially through the slots 42 via their circumferential open ends 46. Once received in the slots 42, abutment between confronting and opposing surfaces of the thrust washer 22 and the shift cam housing 16 (particularly, the tabs 96 and slots 42) precludes and constrains axial movement of the thrust washer 22 with respect to the shift cam housing 16, and keeps the thrust washer 22 in place and in position at the slots 42. Further, and as described below in more detail, abutment between confronting and opposing surfaces of the thrust washer 22 and the base cam 24 precludes and constrains circumferential movement of the thrust washer 22 with respect to the shift cam housing 16, and further keeps the thrust washer 22 in place and in position at the slots 42.

The function of the thrust washer 22 and its tabs 96 was previously carried out by a snap ring part and a retainer plate part and accompanying retainer plate threaded bolt parts in the past devices, permitting whole removal of the snap ring part and the retainer plate and threaded bolt parts in the dual drive gear shift assembly 10. The threaded bolt parts, in particular, had challenging alignment procedures for instal- lation, and hence their removal is useful at least in this regard.

The base cam 24 serves to cooperate with the apply cam 36 and the cam balls 34 for upward axial movement of the apply cam 36 relative to the base cam 24 upon rotational movement of the apply cam 36. The cam balls 34 ride in grooved and curved surfaces of the base cam 24. The base cam 24 can have varying designs and constructions in varying embodiments. In this embodiment, and with refer- ence to FIGS. 3 and 7, the base cam 24 is situated near or at an interior of the shift cam housing 16 in assembly and installation of the dual drive gear shift assembly 10, and is positioned and located at the main body portion 38 and at the axial upper region of the shift cam housing 16. The base cam 24 is seated at the main body portion 38. Relative to the thrust washer 22, the base cam 24 is located adjacent the component and is positioned approximately in axial align- ment therewith. The base cam 24 has a cam main body 102 and a pair of bosses 104. The cam main body 102 has grooved and curved surfaces for receipt of the cam balls 34 of the apply cam 36, as illustrated in FIG. 3. The bosses 104 depend from the cam main body 102 and extend radially outboard therefrom at a radially-outboard location and boundary thereof. Here, there are two bosses 104 in total that are spaced circumferentially apart from one another about the radially-inboard boundary; still, other quantities are possible in other embodiments. The bosses 104 can be spaced one-hundred-and-eighty degrees (180°) circumfer- entially apart from each other about the cam main body 102.

The bosses 104 are received in the cutouts 58 of the shift cam housing 16 when the base cam 24 is seated in the shift cam housing 16. More specifically, one boss 104 is inserted into the second cutout 68, and the other boss 104 is inserted into the fourth cutout 72. As set forth, the second and fourth cutouts 68, 72 exhibit the shallower axial depths with respect to the first and third cutouts 66, 70 which are deeper in axial depth. The bosses 104 are shaped and sized complementary to the second and fourth cutouts 68, 72 for a substantially full fit thereamong, and particularly for a side-to-side cir- cumferential close-fit. Interaction between the bosses 104 and the tabs 96 of the thrust washer 22 keeps the thrust washer 22 from inadvertently rotating and backing out of its intended position relative to the shift cam housing 16. With particular reference to FIG. 7, once the bosses 104 are received in the cutouts 58, surface-to-surface engagement and abutment between the bosses 104 and the tabs 96 precludes and constrains unwanted circumferential move- ment of the thrust washer 22 with respect to the shift cam housing 16. By physically occupying the cutouts 58 at the circumferential open ends 46 of the slots 42, the bosses 104 block the tabs 96 from exiting the slots 42. Escape of the tabs 96 from the slots 42 is hence physically prevented by the bosses 104. At least a certain degree, if not all, of circum- ferential and rotational movement of the thrust washer 22 with respect to the shift cam housing 16 is constrained via the bosses 104 when the base cam 24 is seated in the shift cam housing 16. In this way, the thrust washer 22 is kept in place amid use of the dual drive gear shift assembly 10 via the base cam 24 and its bosses 104.

Figure 8:
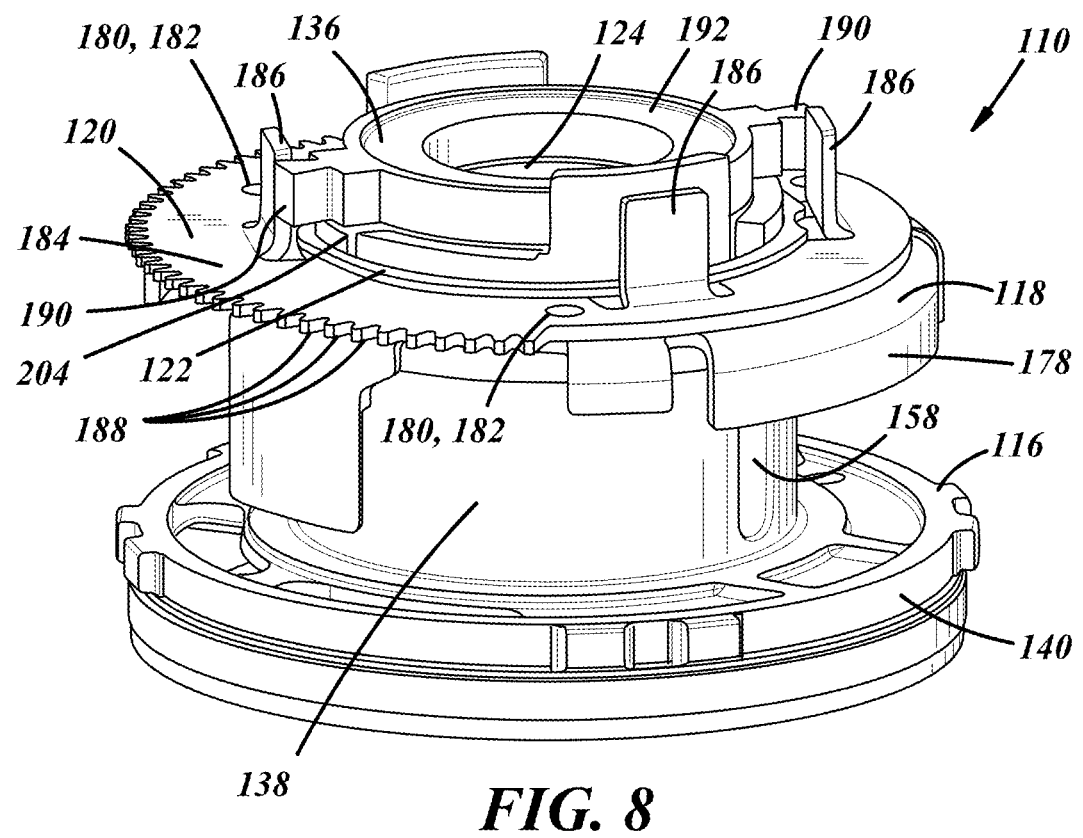
FIG. 8 is a perspective view of another embodiment of the dual drive gear shift assembly.
Figure 9:
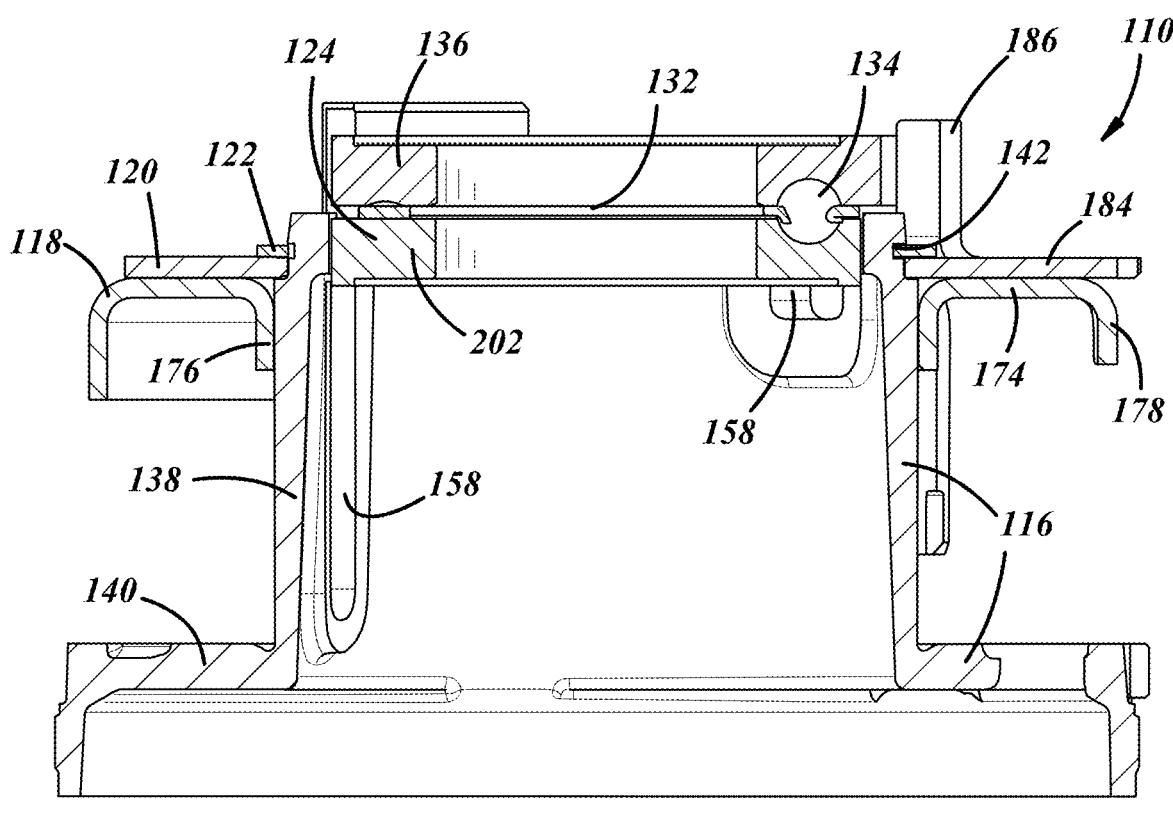
FIG. 9 is a sectional view of the dual drive gear shift assembly of FIG. 8.

Turning now to FIGS. 8 and 9, a second embodiment of the dual drive gear shift assembly is presented. In the second embodiment—and with the exception of a few compo- nents—corresponding components and elements are num- bered similarly but with numerals 1xx when referring to this second embodiment. For example, the dual drive gear shift assembly is referenced by numeral 10 in the first embodi- ment, and is correspondingly referenced by numeral 110 in the second embodiment. Moreover, similarities may exist between the first embodiment and the second embodiment, some of which may not be repeated here in the description of the second embodiment. At least certain appreciable differences between the embodiments are set forth.

The second embodiment of the dual drive gear shift assembly 110 is designed and constructed to effect one- speed shifting in the automotive transfer case 14. The dual drive gear shift assembly 110 can have various designs, constructions, and components in various embodiments depending upon—among other potential factors—the vehicle gearbox in which the dual drive gear shift assembly 110 is installed and the intended parameters of its shifting capabilities. In the second embodiment of FIGS. 8 and 9, the dual drive gear shift assembly 110 includes a shift cam housing 116, a sensor plate 118, a dual drive gear 120, a thrust washer 122 (or a self-lock thrust washer), and a base cam 124; still, more, less, and/or different components are possible in other embodiments. Furthermore, skilled artisans may appreciate that the dual drive gear shift assembly 110 can also include a cam ball cage 132, cam balls 134, and an apply cam 136.

The shift cam housing 116 of the second embodiment can be the same as the shift cam housing 16 of the first embodiment in terms of size, shape, features, and structure. The shift cam housing 116 has a main body portion 138 and an expanded-diameter portion 140. As before, for accepting circumferentially-directed insertion of a multitude of tabs (introduced below) of the thrush washer 122, a multitude of slots 142 are defined in and reside in the main body portion 138 of the shift cam housing 116. The slots 142 are shaped and sized to receive the tabs and are located at an axial upper region of the shift cam housing 116. Longitudinal extents of the slots 142 are arranged in the circumferential direction relative to the shift cam housing 116 in order to receive circumferential insertion movement of the tabs. There are a total of four slots 142 to match the number of corresponding tabs; still, in other embodiments other quantities are possible including a single slot. The four slots 142 are spaced about the shift cam housing 116 circumferentially therearound and apart from one another. Furthermore, as before, for accept- ing axially-directed insertion of the tabs of the thrust washer 122, a multitude of cutouts 158 are defined in and reside in the main body portion 138 of the shift cam housing 116. The cutouts 158 also accept axially-directed insertion and recep- tion of bosses (introduced below) of the base cam 124. The cutouts 158 are located adjacent the slots 142, and indeed the cutouts 158 and slots 142 intersect with each other and communicate with each other. The cutouts 158 are shaped and sized to receive the tabs and to receive the bosses, and are located at the axial upper region of the shift cam housing 116.

The sensor plate 118 has a main body portion 174, a shroud 176, and a multitude of projections 178. As before, the sensor plate 118 and dual drive gear 120 are fully constrained to each other via an attachment 180 therebe- tween. The attachment 180 can take varying forms in varying embodiments. Here, the attachment 180 takes the form of a multitude of rivet pins 182 that are pressed into holes established in the main bodies of the sensor plate 118 and dual drive gear 120. Relative movement between the two components is thereby precluded.

Furthermore, in the second embodiment, the dual drive gear 120 has a gear main body 184 and a multitude of projections 186. Gear teeth 188 extend radially outboard of the gear main body 184 for engagement and disengagement by gears external of the dual drive gear shift assembly 110. The projections 186 come into engagement with protuberances 190 of the apply cam 136. The protuberances 190 extend radially-outboard of a main body 192 of the apply cam 136.

The thrust washer 122 of the second embodiment can be the same as the thrust washer 22 of the first embodiment in terms of size, shape, features, and structure. As before, the thrust washer 122 has a washer main body and a multitude of tabs. The tabs depend from the washer main body and extend radially inboard therefrom at a radially-inboard location and boundary thereof. There are four tabs in total that are spaced circumferentially apart from one another about the radially-inboard boundary; still, other quantities are possible in other embodiments. A first pair of the tabs possesses a first circumferential size and extent, while a second pair of the tabs possesses a second circumferential size and extent. The first and second circumferential sizes differ with respect to each other; here, the first circumferential size is greater than the second circumferential size. Similarly, a first pair of the cutouts 158 of the shift cam housing 116 possesses the first circumferential size and extent that corresponds to that of the first pair of the tabs, and a second pair of the cutouts 158 possesses the second circumferential size and extent that corresponds to that of the second pair of the tabs. Furthermore, as before, the thrust washer 122 is initially inserted axially downward through the cutouts 158 and is subsequently inserted circumferentially through the slots 142. Once received in the slots 142, abutment between confronting and opposing surfaces of the thrust washer 122 and the shift cam housing 116 precludes and constrains axial movement of the thrust washer 122 with respect to the shift cam housing 116, and keeps the thrust washer 122 in place and in position at the slots 142. Further, abutment between confronting and opposing surfaces of the thrust washer 122 and the base cam 124 precludes and constrains circumferential movement of the thrust washer 122 with respect to the shift cam housing 116, and further keeps the thrust washer 122 in place and in position at the slots 142.

The base cam 124 has a cam main body 202 and a pair of bosses 204. The bosses 204 depend from the cam main body 202 and extend radially outboard therefrom at a radially-outboard location and boundary thereof. Here, there are two bosses 204 in total that are spaced circumferentially apart from one another about the radially-inboard boundary; still, other quantities are possible in other embodiments. The bosses 204 can be spaced one-hundred-and-eighty degrees (180°) circumferentially apart from each other about the cam main body 202. As before, the bosses 204 are received in the cutouts 158 of the shift cam housing 116 when the base cam 124 is seated in the shift cam housing 116. Once the bosses 204 are received in the cutouts 158, surface-to-surface engagement and abutment between the bosses 204 and the tabs of the thrust washer 122 precludes and constrains unwanted circumferential movement of the thrust washer 122 with respect to the shift cam housing 116.

As used herein, the terms "general" and "generally" and "substantially" are intended to account for the inherent degree of variance and imprecision that is often attributed to, and often accompanies, any design and manufacturing process, including engineering tolerances—and without deviation from the relevant functionality and outcome—such that mathematical precision and exactitude is not implied and, in some instances, is not possible. In other instances, the terms "general" and "generally" and "substantially" are intended to represent the inherent degree of uncertainty that is often attributed to any quantitative comparison, value, and measurement calculation, or other similar representation.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A dual drive gear shift assembly for a vehicle gearbox, the dual drive gear shift assembly comprising:
   a shift cam housing;
   a sensor plate situated adjacent a periphery of the shift cam housing;
   a dual drive gear situated adjacent the periphery of the shift cam housing and constrained to the sensor plate via attachment therebetween, the dual drive gear having a gear main body and at least one projection extending axially from the gear main body depending from the gear main body, radially inboard from an outer diameter of the gear main body and radially outboard from an inner diameter of the gear main body, the at least one projection engageable with an apply cam of the dual drive gear shift assembly amid use of the dual drive gear shift assembly; and
   a thrust washer, wherein the sensor plate is located axially in a first direction relative to the dual drive gear and the thrust washer is located axially in a second direction opposite the first direction relative to the dual drive gear.

2. The dual drive gear shift assembly as set forth in claim 1, wherein the attachment between the dual drive gear and the sensor plate is via a plurality of rivets.

3. The dual drive gear shift assembly as set forth in claim 1, wherein the at least one projection comprises a plurality of projections extending axially from the gear main body of the dual drive gear and spaced circumferentially from one another adjacent an inboard boundary of the gear main body.

4. The dual drive gear shift assembly as set forth in claim 1, wherein the thrust washer has at least one tab, the shift cam housing having at least one slot, wherein, in assembly of the dual drive gear shift assembly, the at least one tab is received in the at least one slot thereby constraining axial movement of the thrust washer with respect to the shift cam housing.

5. The dual drive gear shift assembly as set forth in claim 4, further comprising a base cam, the base cam having at least one boss, the shift cam housing having at least one cutout residing adjacent the at least one slot, wherein, in assembly of the dual drive gear shift assembly, the at least one boss is received in the at least one cutout thereby constraining circumferential movement of the thrust washer with respect to the shift cam housing.

6. The dual drive gear shift assembly as set forth in claim 1, wherein the dual drive gear shift assembly is an automotive transfer case dual drive gear shift assembly for an automotive transfer case.

7. A dual drive gear shift assembly for a vehicle gearbox, the dual drive gear shift assembly comprising:

a shift cam housing having at least one slot residing therein, the at least one slot having a circumferential open end configured to receive circumferential insertion of a tab, the at least one slot having a circumferential closed end;

a sensor plate situated adjacent a periphery of the shift cam housing;

a dual drive gear situated adjacent the periphery of the shift cam housing and adjacent the sensor plate; and a thrust washer having a washer main body and at least one tab extending radially inboard from the washer main body, the thrust washer situated adjacent the periphery of the shift cam housing and adjacent the dual drive gear, the at least one tab received in circumferential open end the at least one slot of the shift cam housing and thereby constraining axial movement of the thrust washer with respect to the shift cam housing and restricting axial movement of the dual drive gear in one axial direction.

8. The dual drive gear shift assembly as set forth in claim 7, further comprising a base cam seated at the shift cam housing, the base cam having a cam main body and at least one boss extending radially outboard from the cam main body, the at least one boss preventing escape of the at least one tab from the at least one slot when the base cam is seated at the shift cam housing.

9. The dual drive gear shift assembly as set forth in claim 7, further comprising a base cam having at least one boss, the shift cam housing having at least one cutout, an open end of the at least one slot residing at the at least one cutout, the at least one boss being received in the at least one cutout and blocking the at least one tab from exiting the at least one slot.

10. The dual drive gear shift assembly as set forth in claim 9, wherein at least some circumferential movement between the thrust washer and the shift cam housing is constrained via the at least one boss.

11. The dual drive gear shift assembly as set forth in claim 7, wherein the dual drive gear and the sensor plate are attached to each other.

12. The dual drive gear shift assembly as set forth in claim 7, wherein the dual drive gear has at least one axially-extending projection that is engageable with an apply cam of the dual drive gear shift assembly amid use of the dual drive gear shift assembly.

13. The dual drive gear shift assembly as set forth in claim 7, wherein the dual drive gear shift assembly is an automotive transfer case dual drive gear shift assembly for an automotive transfer case.

14. The dual drive gear shift assembly as set forth in claim 7, wherein the thrust washer includes a first pair of tabs including the at least one tab and possessing a first circumferential size and extent, and wherein the thrust washer further includes a second pair of tabs possessing a second circumferential size and extent, and wherein the first and second circumferential sizes differ with respect to each other.

15. A dual drive gear shift assembly for a vehicle gearbox, the dual drive gear shift assembly comprising:

a shift cam housing, at least one slot residing in the shift cam housing and at least one cutout residing in the shift cam housing, wherein the at least one slot has a circumferential open end and a circumferential closed end;

a sensor plate situated adjacent a periphery of the shift cam housing;

a dual drive gear situated adjacent the periphery of the shift cam housing, the dual drive gear and sensor plate being attached to each other, the dual drive gear having at least one axially-extending projection;

a thrust washer situated adjacent the periphery of the shift cam housing and having at least one radially-extending tab; and a base cam having at least one radially-extending boss;

wherein, in assembly of the dual drive gear shift assembly, the at least one radially-extending tab of the thrust washer is received in the at least one slot of the shift cam housing and the at least one radially-extending boss of the base cam is received in the at least one cutout of the shift cam housing such that the at least one radially-extending boss of the base cam occupies the at least one cutout at the circumferential open end of the at least one slot and constrains circumferential movement of the thrust washer relative to the shift cam housing.

16. The dual drive gear shift assembly as set forth in claim 15, wherein relative axial movement between the shift cam housing and the thrust washer is at least partially constrained via the reception of the at least one radially-extending tab in the at least one slot, and relative circumferential movement between the shift cam housing and the thrust washer is at least partially constrained via the reception of the at least one radially-extending boss in the at least one cutout.

17. The dual drive gear shift assembly as set forth in claim 15, wherein the at least one axially-extending projection comprises a plurality of axially-extending projections extending axially from a gear main body of the dual drive gear and spaced circumferentially from one another adjacent an inboard boundary of the gear main body, and wherein the at least one radially-extending tab comprises a plurality of radially-extending tabs extending radially inboard from a washer main body of the thrust washer and spaced circumferentially from one another with respect to the washer main body.

18. The dual drive gear shift assembly as set forth in claim 15, wherein the dual drive gear shift assembly is an automotive transfer case dual drive gear shift assembly for an automotive transfer case.

\* \* \* \* \*